(12) United States Patent
Chang

(10) Patent No.: US 11,539,934 B2
(45) Date of Patent: Dec. 27, 2022

(54) IMAGE DISPLAY METHOD AND IMAGE SURVEILLANCE SYSTEM

(71) Applicant: NADI SYSTEM CORP., Taipei (TW)

(72) Inventor: Syuan-Pei Chang, Taipei (TW)

( * ) Notice: Subject to any disclaimer, the term of this patent is extended or adjusted under 35 U.S.C. 154(b) by 0 days.

(21) Appl. No.: 17/389,297

(22) Filed: Jul. 29, 2021

(65) Prior Publication Data

US 2022/0038677 A1 Feb. 3, 2022

(30) Foreign Application Priority Data

Jul. 30, 2020 (TW) ................................. 109125788

(51) Int. Cl.
*H04N 13/275* (2018.01)
*G06V 20/52* (2022.01)

(52) U.S. Cl.
CPC ........... *H04N 13/275* (2018.05); *G06V 20/52* (2022.01)

(58) Field of Classification Search
USPC ........................................................ 348/46
See application file for complete search history.

(56) References Cited

U.S. PATENT DOCUMENTS

2019/0083885 A1* 3/2019 Yee ..................... A63F 13/40
2020/0169714 A1* 5/2020 Chang ................. H04N 13/122

FOREIGN PATENT DOCUMENTS

CN 110876643 B * 12/2021 ......... A61B 1/00039

* cited by examiner

*Primary Examiner* — Behrooz M Senfi

(57) ABSTRACT

An image display method used by an image surveillance system is provided. The image surveillance system includes a plurality of cameras. The camera is configured to shoot a part of a physical environment to form a real-time image. The image display method has the following steps: First, a three-dimensional space model corresponding to the physical environment is established. Next, based on the height, the shooting angle and the focal length of the camera, a corresponding viewing frustum is established for each of the camera. According to the viewing frustum, a shooting coverage area of the camera in the physical environment is obtained. Next, a virtual coverage area corresponding to the shooting coverage area is searched out in the three-dimensional space model. Next, the real-time image is imported to a three-dimensional space model and projected to the virtual coverage area.

10 Claims, 17 Drawing Sheets

IMAGE DISPLAY METHOD AND IMAGE SURVEILLANCE SYSTEM

BACKGROUND OF THE INVENTION

Field of the Disclosure

The present invention relates to an image display method and an image surveillance system, and more particularly to the mage display method and the image surveillance system involving image fusion and projection of images on a three-dimensional space model.

Description of Related Art

At present, due to the continuous increase in labor costs, more and more people tend to use image surveillance systems for security work in order to obtain the most comprehensive protection under limited human resources. Especially in situations involving public environmental safety, such as department stores, hypermarkets, and airports, image surveillance systems have long been universal. Image surveillance systems are usually configured with a plurality of cameras. Besides, the images captured by each camera are displayed on the display screen at the same time or time-sharing to monitor simultaneous a plurality of locations, e.g., hall entrance, parking lot. However, if the image surveillance system is to be used in large area, it needs a lot of cameras. Thus, it will also cause inconvenience to the surveillance personnel. The surveillance personnel cannot comprehensively watch each display screen.

For example, when an object or a human body moves in a large area, it will move between different cameras. The surveillance personnel need to evaluate and guess according to different cameras and cannot respond and control the screen in the first time. In more detail, if a person moves from the shooting range of camera No. 1 to the shooting range of camera No. 3, the surveillance personnel also need to move the line of sight from the display screen of camera No. 1 to the display screen of camera No. 3. However, the scope of the public environment is huge, and it is difficult for surveillance personnel to remember exactly which camera is corresponding to which shooting range, which will cause blind spots in monitoring.

In addition, because the development of information technology in recent years, many monitoring tasks have also been performed by computers. However, it is quite difficult for computers to identify whether objects or human bodies appearing on different cameras are the same. This requires more complex algorithms and more computing resources.

Therefore, how to solve the above problems is worth considering for person having ordinary skill in the art.

SUMMARY OF THE INVENTION

The objective of the present invention is to provide an image display method. The image display method is configured to display real-time surveillance images of different areas and identify whether objects or human bodies appearing on different cameras are the same.

The image display method in the present invention is used to an image surveillance system. The image surveillance system includes a plurality of cameras. The camera is configured to shoot a part of a physical environment to form a real-time image. The image display method has the following steps:

(a) A three-dimensional spatial model is established, and the three-dimensional spatial model is corresponding to the physical environment;
(b) A corresponding viewing frustum is established for each camera according to a height, a shooting angle and a focal length of the camera, and a shooting coverage area of the camera in the physical environment is obtained according to the viewing frustum;
(c) A virtual coverage area corresponding to the shooting coverage area is searched out in the three-dimensional space model; and
(d) The real-time image is imported to the three-dimensional space model and projected the real-time image to the virtual coverage area. In the image display method, the step (d) has the following steps:
(d1) A corresponding mesh model for each camera is established, and the mesh model has a plurality of mesh points;
(d2) The mesh model is projected according to the viewing frustum to let each mesh point and the virtual coverage area perform a mapping calculation to obtain a projection position of each mesh point, and these projection positions are combined to form a final mesh model; and
(d3) The real-time image shot by the camera is imported to the three-dimensional space model to let the final mesh model display the real-time image.

In the image display method, when the real-time images shot by a plurality of cameras overlap partially, an image fusion algorithm is used. Overlapping real-time images are converted to a composite image according to an image fusion algorithm. The composite image is projected to the virtual coverage area.

In the image display method, the image fusion algorithm has a scale-invariant feature transform algorithm.

In the image display method, when some of the mesh points of the mesh model cannot perform the mapping calculation with the virtual coverage area, some of the mesh points are projected to an extension plane of an edge of the virtual coverage area.

Another objective of the present invention is to provide an image surveillance system. The image surveillance system is configured to display real-time surveillance images of different areas and identify whether objects or human bodies appearing on different cameras are the same.

The image surveillance system in the present invention has a plurality of cameras, a storage device, and an image processing device. The image processing device has an adjusting component, a searching component, and an image import component. The camera is configured to shoot a part of a physical environment to form a real-time image. The storage device is configured to store a three-dimensional spatial model. The three-dimensional spatial model is corresponding to the physical environment. The image processing device is connected to the camera. The adjusting component is configured to establish a corresponding viewing frustum for each camera according to a height, a shooting angle, and a focal length of the camera. A shooting coverage area of the camera in the physical environment is obtained according to the viewing frustum. A searching component is configured to search out a virtual coverage area in the three-dimensional space model, and the virtual coverage area is corresponding to the shooting coverage area. An image import component is configured to import the real-time image to the three-dimensional space model. The real-time image is projected to the virtual coverage area.

In the image surveillance system, the image import component performs the following steps:

(d1) A corresponding mesh model for each camera is established, and the mesh model has a plurality of mesh points;

(d2) The mesh model is projected according to the viewing frustum to let each mesh point and the virtual coverage area perform a mapping calculation to obtain a projection position of each mesh point, and these projection positions are combined to form a final mesh model; and (d3) The real-time image shot by the camera is imported to the three-dimensional space model to let the final mesh model display the real-time image.

In the image surveillance system, the image processing device further comprises an image fusion component. When the real-time images shot by a plurality of cameras overlap partially, the image fusion component converts overlapping real-time images to a composite image according to an image fusion algorithm.

In the image surveillance system, when some of the mesh points of the mesh model cannot perform the mapping calculation with the virtual coverage area, some of the mesh points are projected to an extension plane of an edge of the virtual coverage area.

In the image surveillance system, the image fusion algorithm has a scale-invariant feature transform algorithm.

The foregoing, as well as additional objects, features and advantages of the invention will be more readily apparent from the following detailed description, which proceeds with reference to the accompanying drawings.

BRIEF DESCRIPTION OF THE DRAWINGS

The objects, spirits, and advantages of the preferred embodiments of the present invention will be readily understood by the accompanying drawings and detailed descriptions, wherein.

DESCRIPTION OF THE PREFERRED EMBODIMENTS

Following preferred embodiments and figures will be described in detail so as to achieve aforesaid objects.

Figure 1:
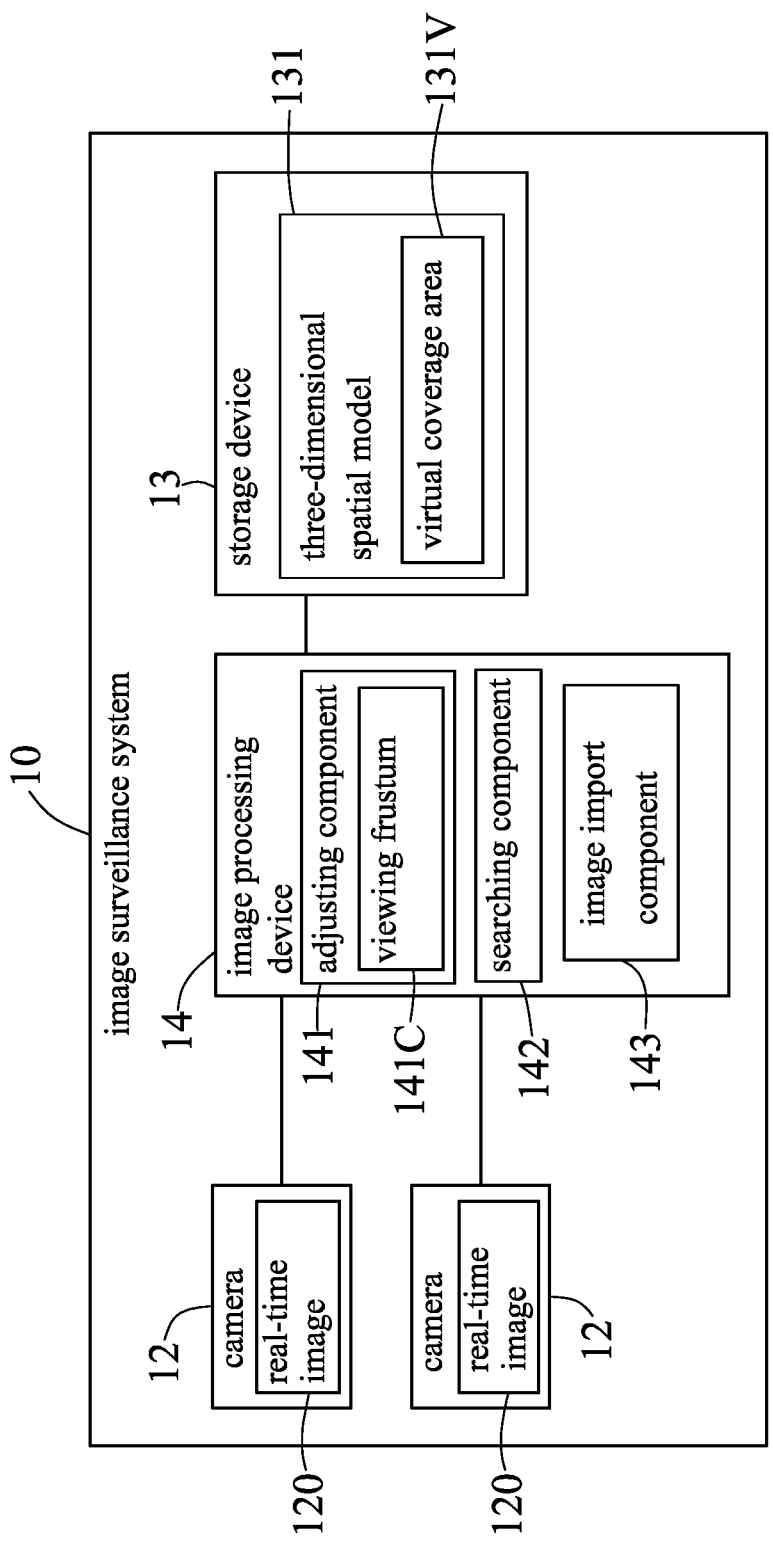
FIG. 1 illustrates a block diagram of an image surveillance system 10 an embodiment of the present invention.
Figure 2A:
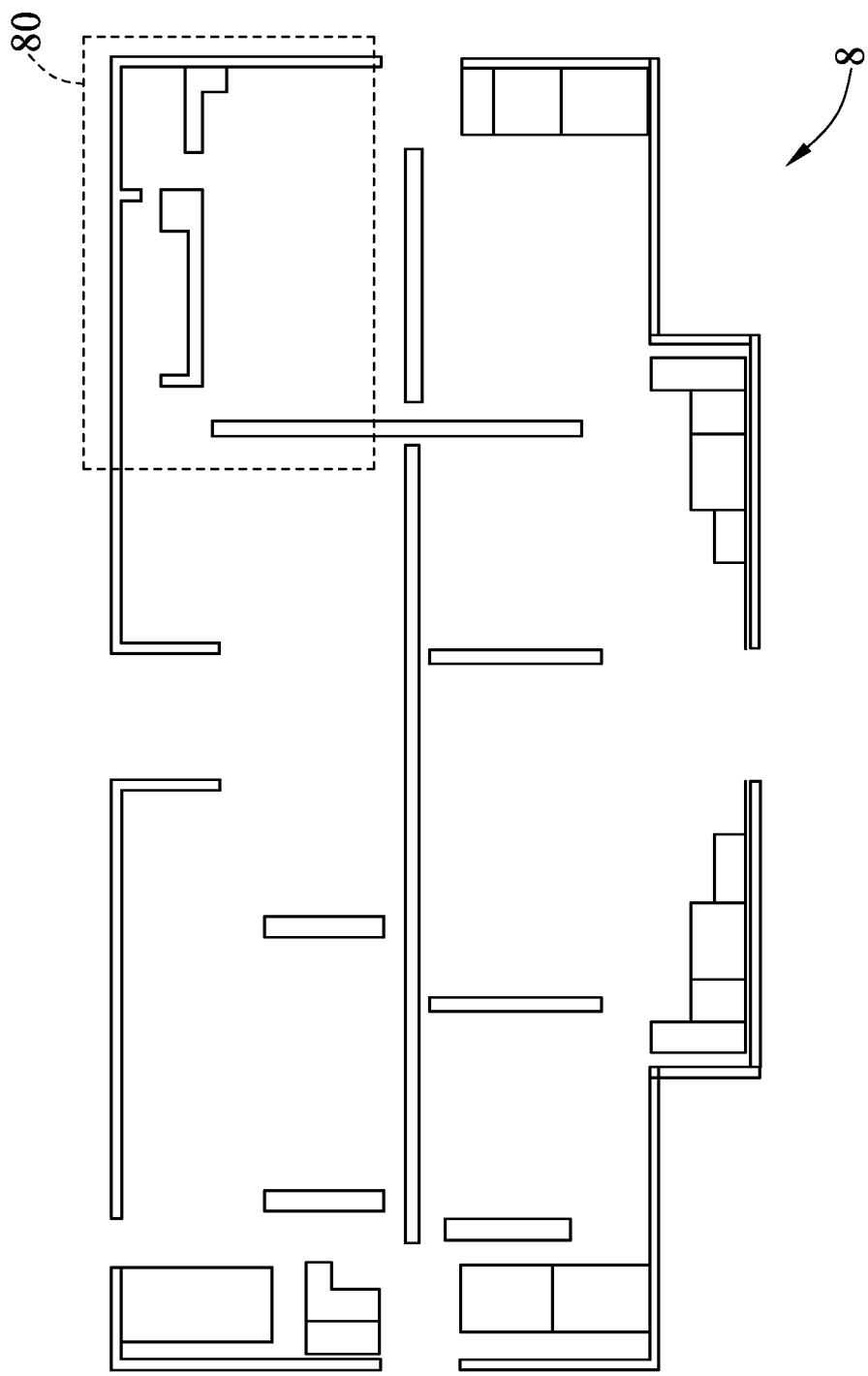
FIG. 2A illustrates a schematic plan view of a physical environment 8.
Figure 2B:
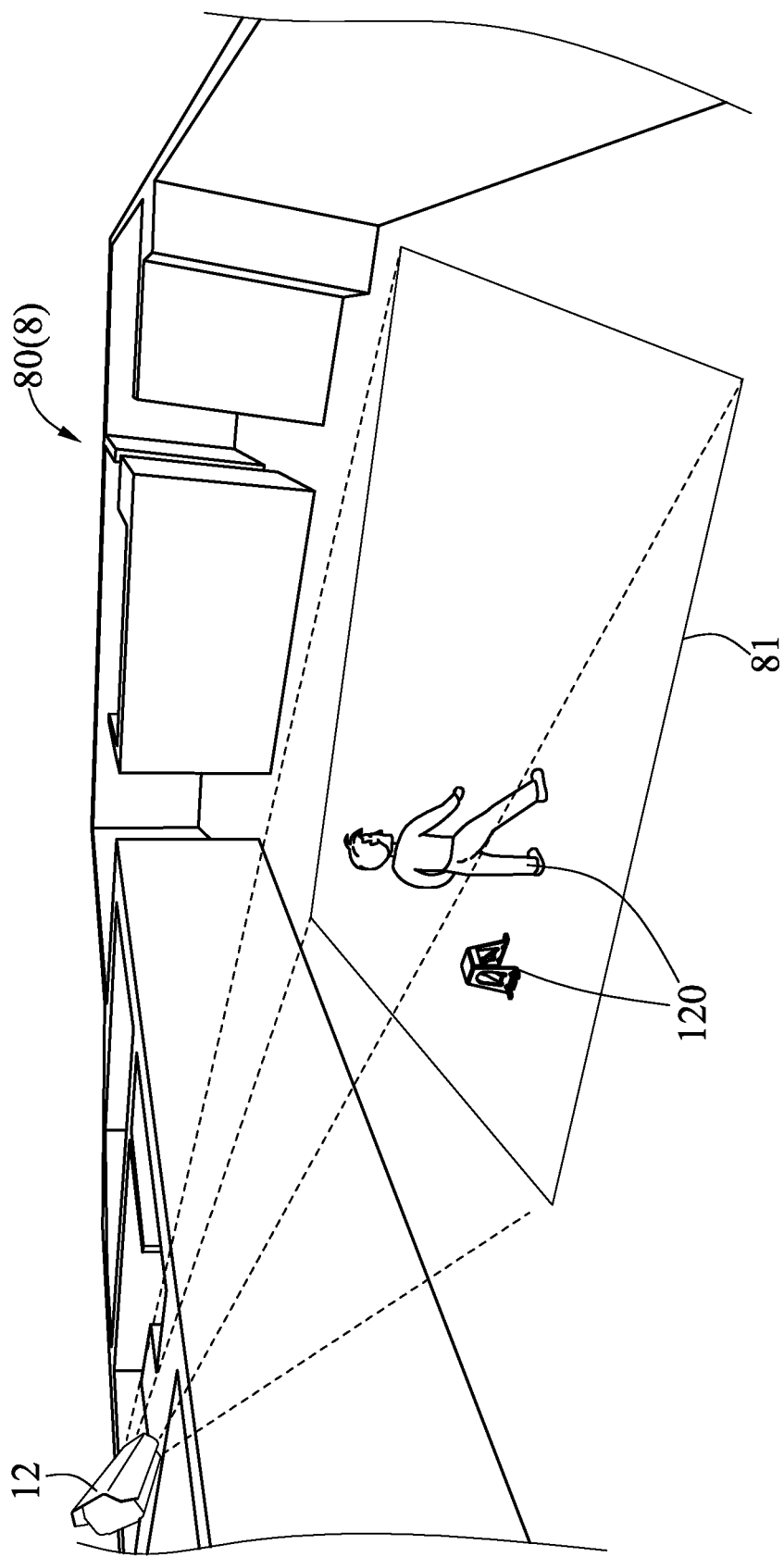
FIG. 2B illustrates a stereogram of a first local area 80 of the physical environment 8.

Please refer to FIG. 1, FIG. 2A and FIG. 2B. FIG. 1 illustrates a block diagram of an image surveillance system 10 an embodiment of the present invention. FIG. 2A illustrates a schematic plan view of a physical environment 8. FIG. 2B illustrates a stereogram of a first local area 80 of the physical environment 8. The image surveillance system 10 has a plurality of cameras 12, a storage device 13 and an image processing device 14. The image processing device 14 has an adjusting component 141, a searching component 142 and an image import component 143. These cameras 12 are respectively configured to shoot different areas of a physical environment 8, that is, a single camera 12 shoots a first local area 80 of the physical environment 8 to form a real-time image 120. In FIG. 2B, the real-time image 120 is an example of a chair and the back of a person.

Figure 3A:
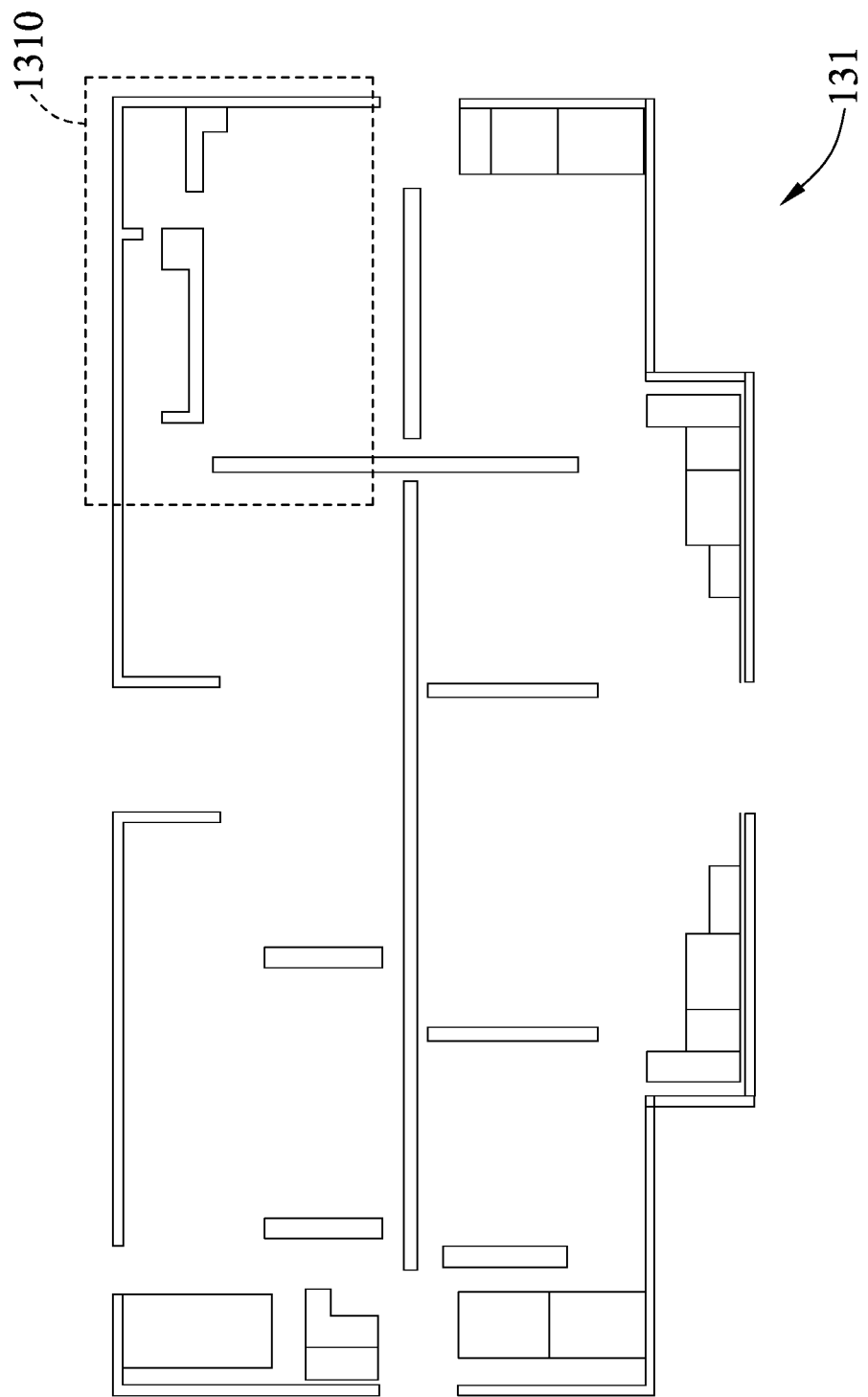
FIG. 3A illustrates a schematic diagram of a three-dimensional spatial model 131.
Figure 3B:
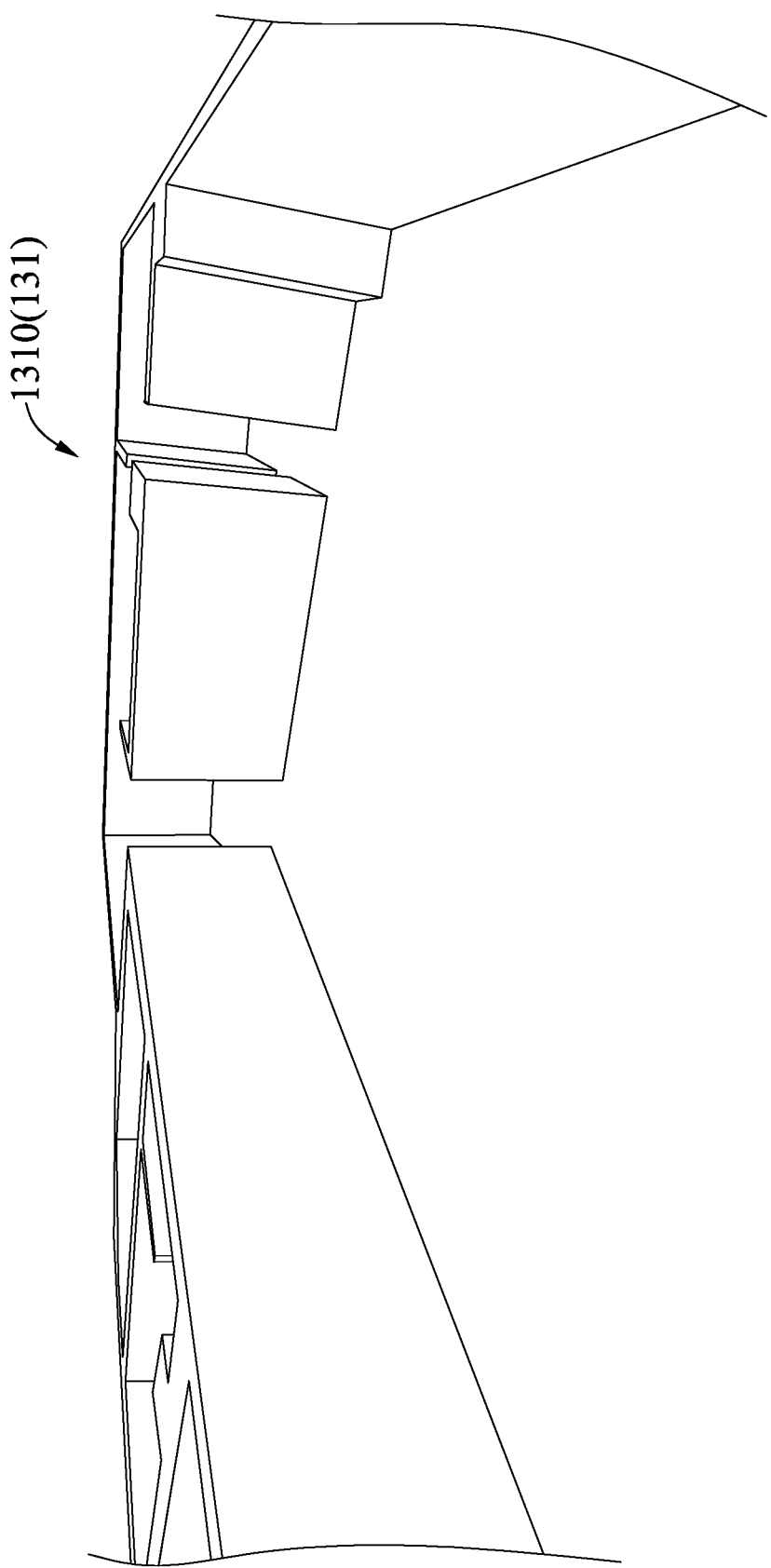
FIG. 3B illustrates a stereogram of a second local area 1310 of the three-dimensional spatial model 131.

Please refer to FIG. 1, FIG. 3A and FIG. 3B. FIG. 3A illustrates a schematic diagram of a three-dimensional spatial model 131. FIG. 3B illustrates a stereogram of a second local area 1310 of the three-dimensional spatial model 131. The storage device 13 is configured to store a three-dimensional spatial model 131. The three-dimensional spatial model 131 is corresponding to the physical environment 8. The first local area 80 is corresponding to the second local area 1310. Specifically, the three-dimensional space model 131 is a 3D environment simulation diagram of the physical environment 8, so the proportion of the building is the same as the proportion of the building in the physical environment 8.

Figure 4A:
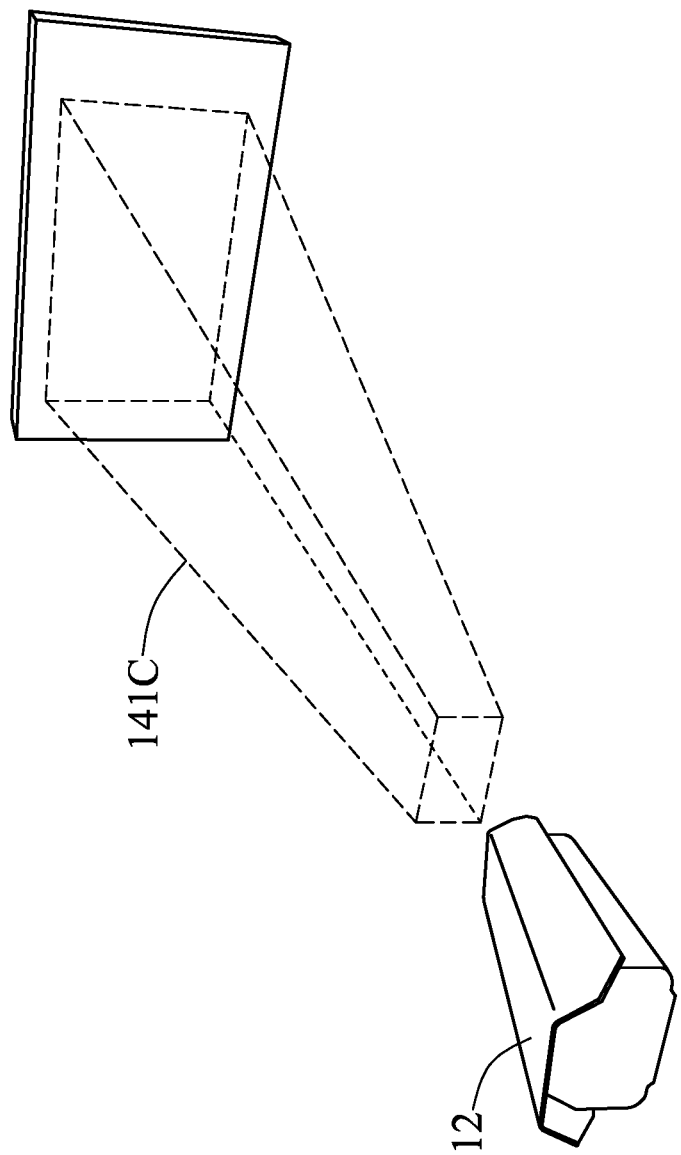
FIG. 4A and FIG. 4B illustrate a schematic diagram of a camera 12 and a viewing frustum 141C.
Figure 4B:
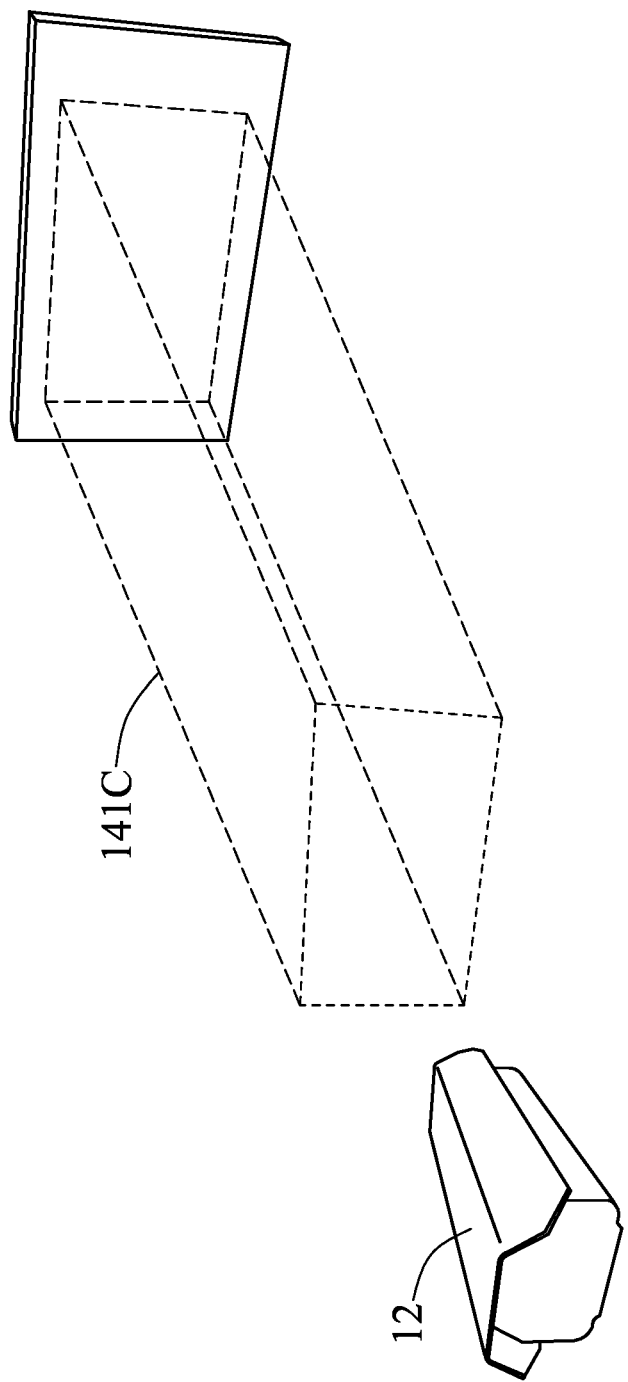

Please refer to FIG. 4A and FIG. 4B. FIG. 4A and FIG. 4B illustrate a schematic diagram of a camera 12 and a viewing frustum 141C.

The adjusting component 141 is configured to establish a corresponding viewing frustum 141C for each camera 12 according to a height, a shooting angle and a focal length of the camera 12. The viewing frustum 141C will form different shapes according to the perspective projection method and the parallel projection method. For example, the shape of the viewing frustum 141C in FIG. 4A is similar to a trapezoid, and the shape of the viewing frustum 141C in FIG. 4B is a rectangular parallelepiped. Please refer to FIG. 2B again. The adjusting component 141 obtains a shooting coverage area 81 of the camera 12 in the physical environment 8 according to the viewing frustum 141C. In detail, the shooting coverage area 81 is the field of view that a single camera 12 can shoot in the physical environment 8.

Figure 5A:
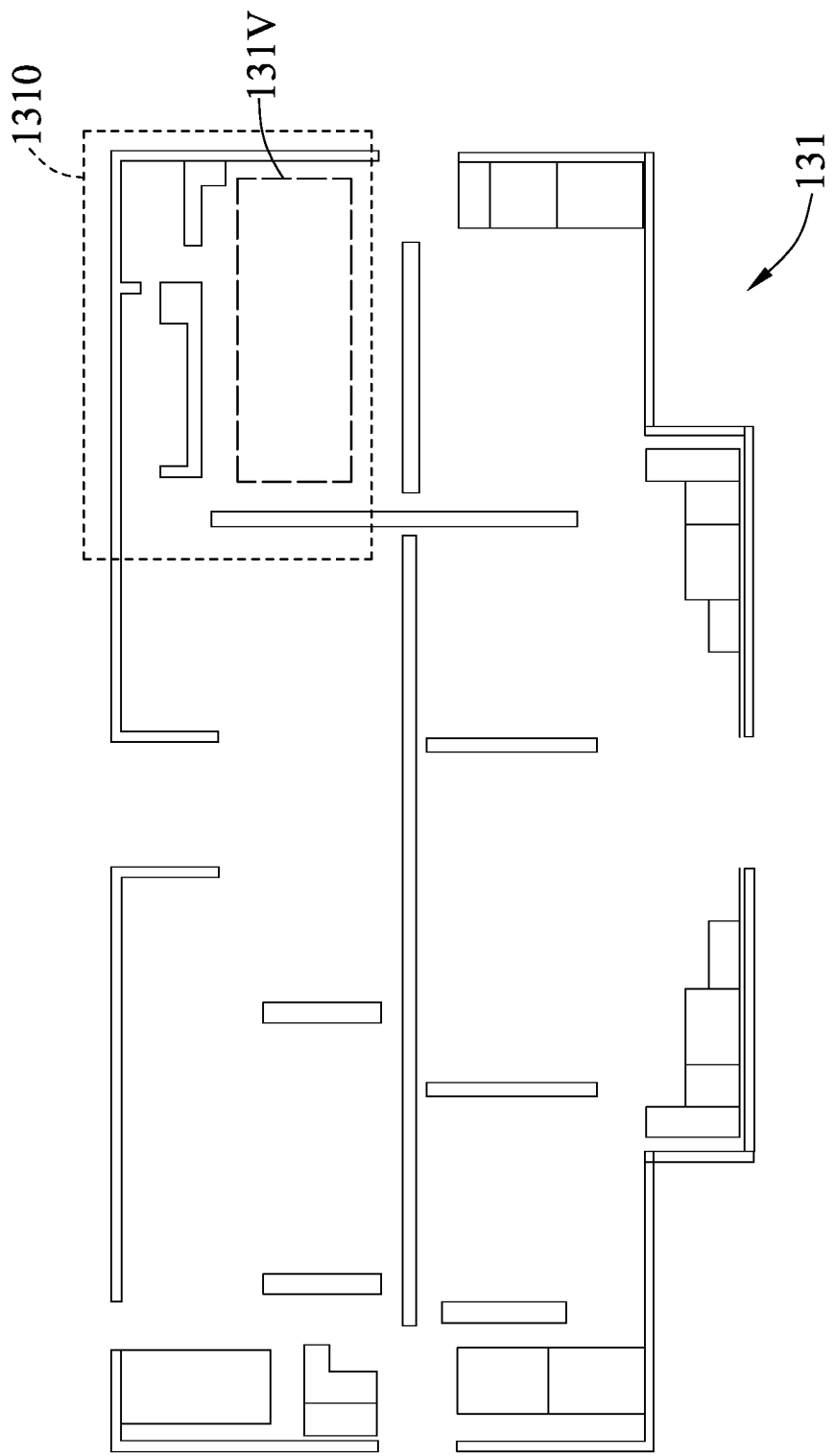
FIG. 5A illustrates a schematic diagram of a virtual coverage area 131V disposed at the three-dimensional spatial model 131.
Figure 5B:
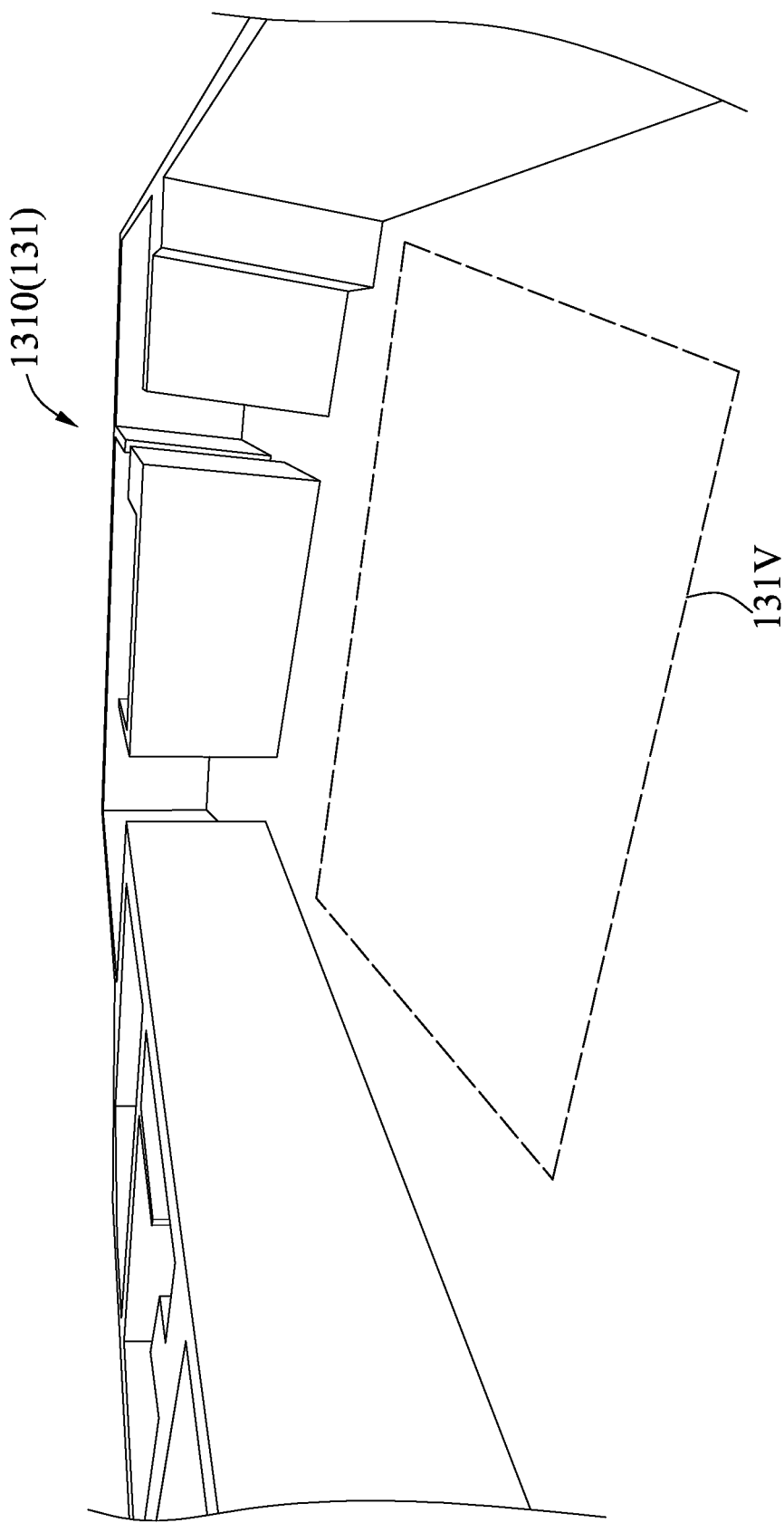
FIG. 5B illustrates a schematic diagram of the virtual coverage area 131V disposed at the second local area 1310.

Please refer to FIG. 1, FIG. 5A and FIG. 5B. FIG. 5A illustrates a schematic diagram of a virtual coverage area 131V disposed at the three-dimensional spatial model 131. FIG. 5B illustrates a schematic diagram of the virtual coverage area 131V disposed at the second local area 1310.

Figure 6:
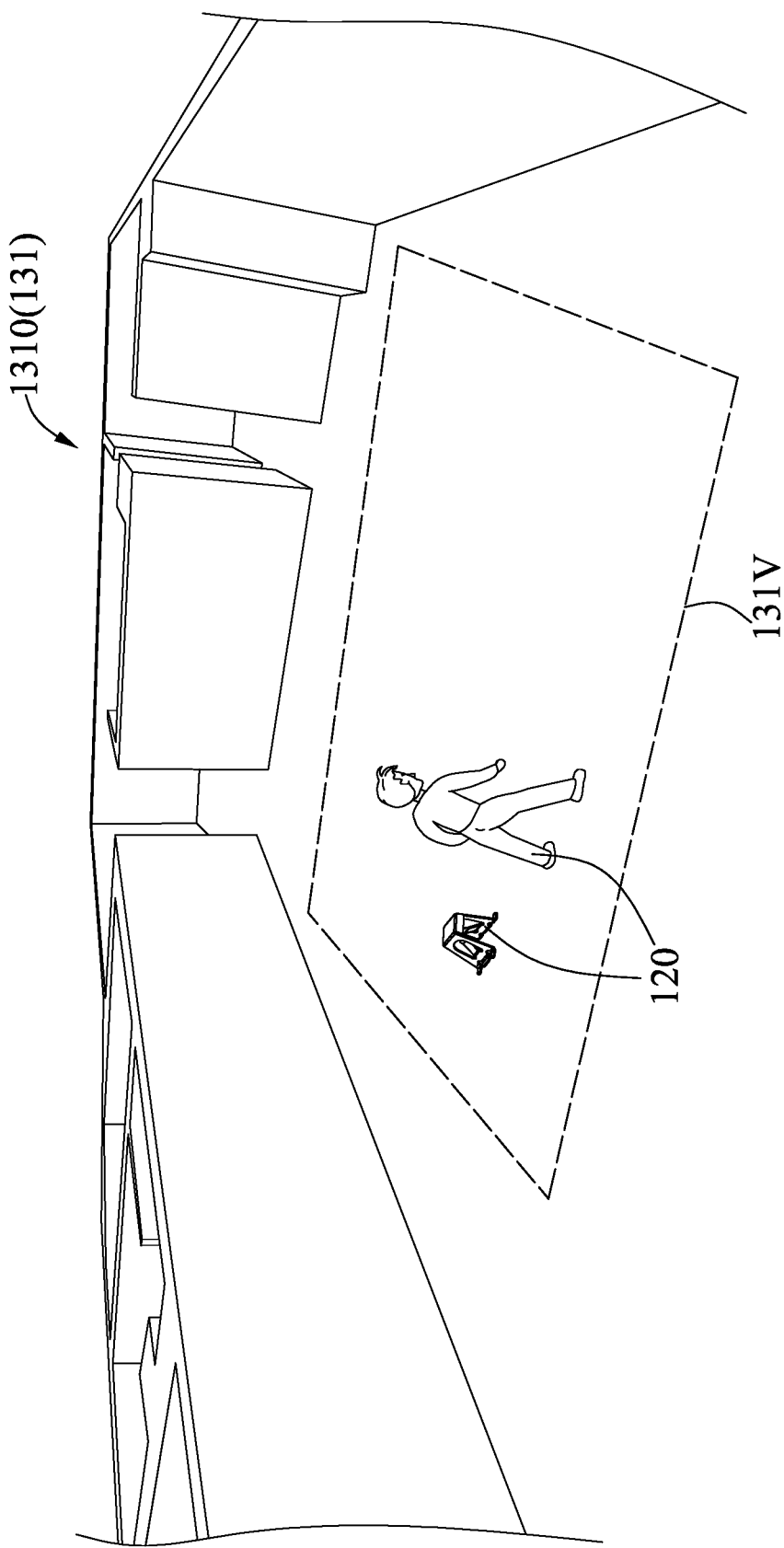
FIG. 6 illustrates a schematic diagram of a real-time image 120 projected on the virtual coverage area 131V.

The searching component 142 is configured to search out a virtual coverage area 131V in the three-dimensional space model 131, and the virtual coverage area 131V is corresponding to the shooting coverage area 81. Please refer to FIG. 6. FIG. 6 illustrates a schematic diagram of a real-time image 120 projected on the virtual coverage area 131V. The image import component 143 is configured to import the real-time image shot by the camera 12 to the three-dimensional space model 131, and the real-time image 120 is projected to the virtual coverage area 131V. In other words, the chair and the back view of the person will be displayed on the surface of the virtual coverage area 131V.

Figure 7:
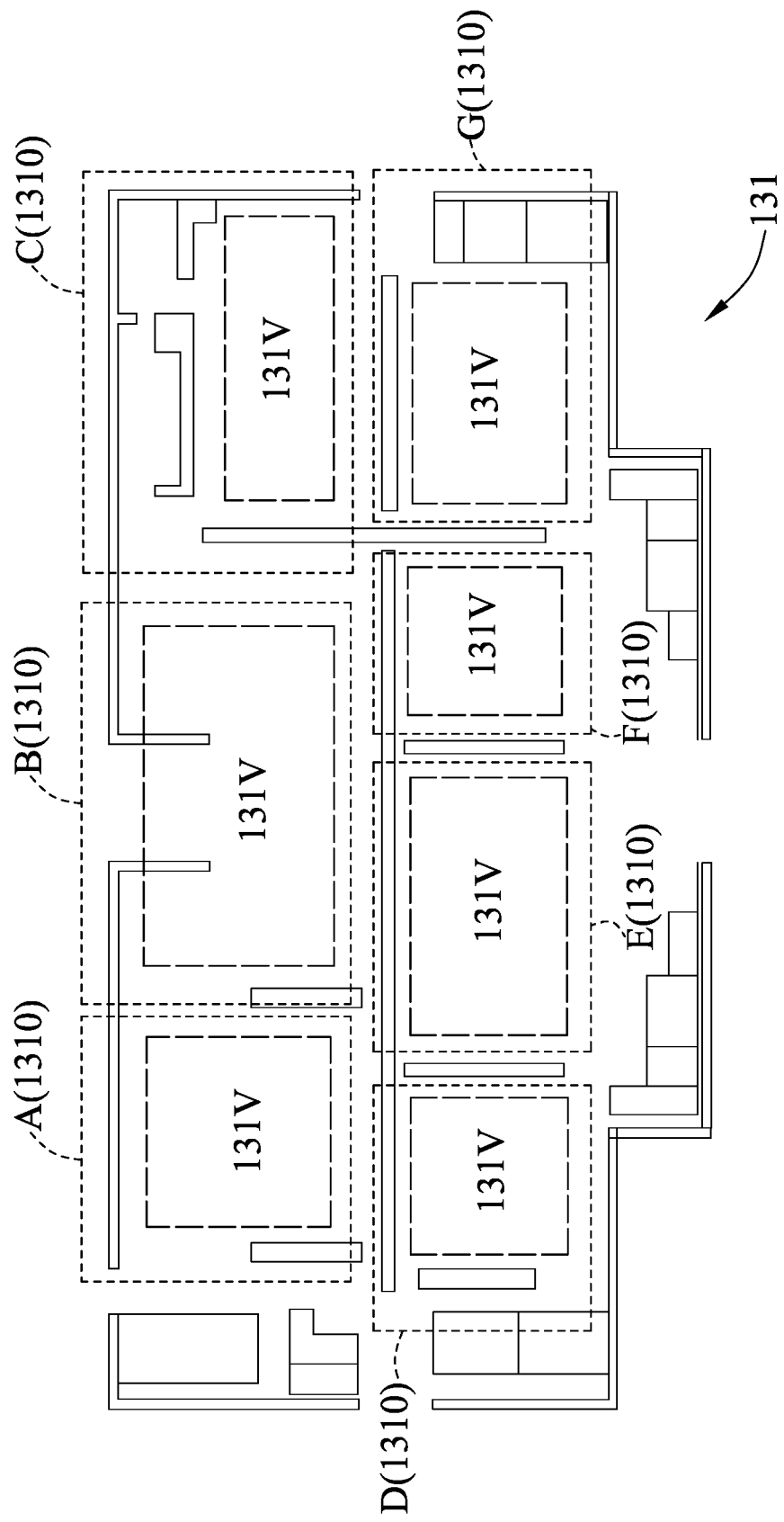
FIG. 7 illustrates a schematic diagram of the three-dimensional spatial mode 131 divided into a plurality of the second local areas 1310.

Please refer to FIG. 7. FIG. 7 illustrates a schematic diagram of the three-dimensional spatial mode 131 divided into a plurality of the second local areas 1310. Because the image surveillance system 10 uses a plurality of cameras 12 to shoot different areas of the physical environment 8, the corresponding virtual coverage area 131V will be searched out in different areas of the three-dimensional spatial mode 131. For example, in FIG. 7, the three-dimensional space model 131 is divided into 7 second local areas 1310, using symbols A~G to distinguish. For example: A(1310), B(1310), and so on to G(1310), each of the second local areas 1310 of A to G has a corresponding virtual coverage area 131V. Therefore, the real-time images 120 in different areas are projected on the corresponding virtual coverage area 131V by the image import component 143. As a result, even if the scope of the physical environment 8 is huge, the image surveillance system 10 can display real-time surveillance images of each area. With the second local area 1310 of A to G and the corresponding virtual coverage area 131V, the surveillance personnel do not need to remember which camera 12 is corresponding to which shooting range. For example, the real-time image 120 displayed in area C is corresponding to the image shot in the first local area 80 in FIG. 2A. Therefore, the surveillance personnel can respond and control the screen at the first time, reducing blind spots in monitoring.

The above, the image import component 143 needs to perform the following steps to project the real-time image 120 to the virtual coverage area 131V.

Figure 8A:
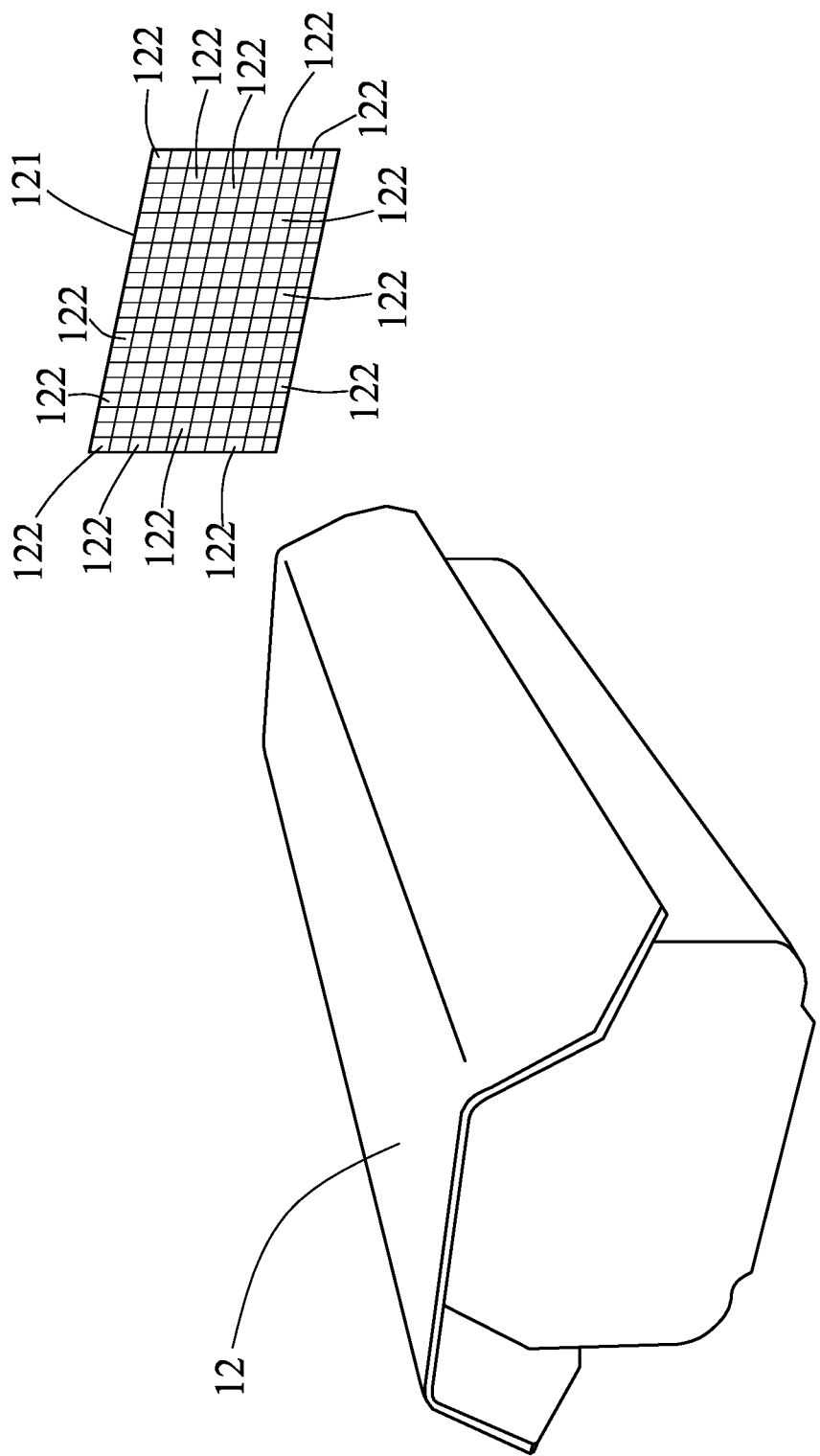
FIG. 8A illustrates a schematic diagram of a camera 12 and a mesh model 121.

First, please refer to FIG. 8A. FIG. 8A illustrates a schematic diagram of a camera 12 and a mesh model 121. A corresponding mesh model 121 for each camera 12 is established, and the mesh model 121 has a plurality of mesh points 122. The density of the grid points 122 are related to the resolution of the camera 12. When the resolution of the camera 12 is higher, the density of the grid points 122 is higher, which is beneficial to projecting a clear image.

Figure 8B:
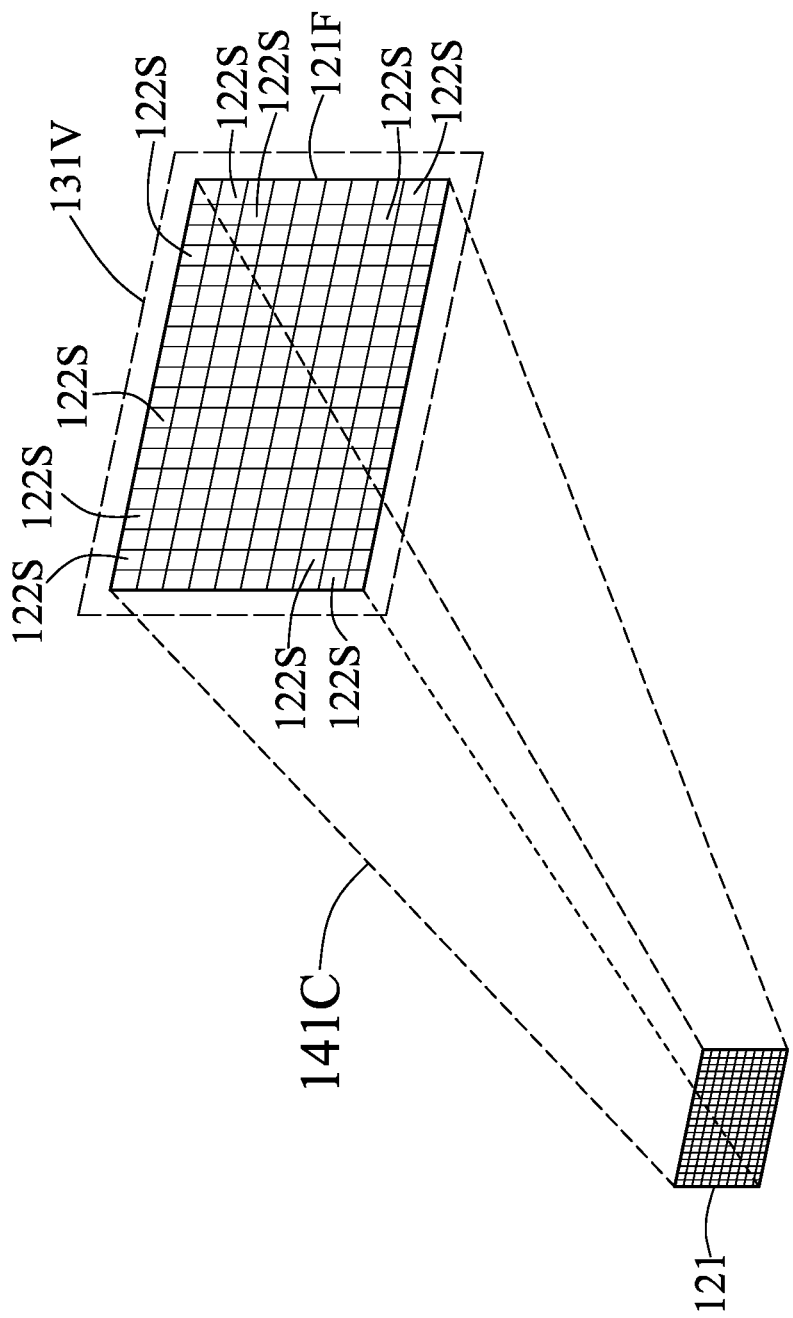
FIG. 8B illustrates a schematic diagram of the mesh model 121, the viewing frustum 141C, a final mesh model 121F and the virtual coverage area 131V.

Afterward, please refer to FIG. 8B. FIG. 8B illustrates a schematic diagram of the mesh model 121, the viewing frustum 141C, a final mesh model 121F and the virtual coverage area 131V. The mesh model 121 is projected according to the viewing frustum 141C to let each mesh point 122 and the virtual coverage area 131V perform a mapping calculation to obtain a projection position 122S of each mesh point 122. These projection positions 122S are combined to form a final mesh model 121F on the surface of the virtual coverage area 131V. It is to be noted that the area of the final mesh model 121F should be the same as the area of the virtual coverage area 131V. However, in order to be distinguished in the figure, in FIG. 8B, the area of the virtual coverage area 131V is slightly larger than the area of the final mesh model 121F.

Afterward, please refer to FIG. 6 again. The real-time image 120 shot by the camera 12 is imported to the three-dimensional space model 131 to let the final mesh model 121F display the real-time image 120.

Figure 9:
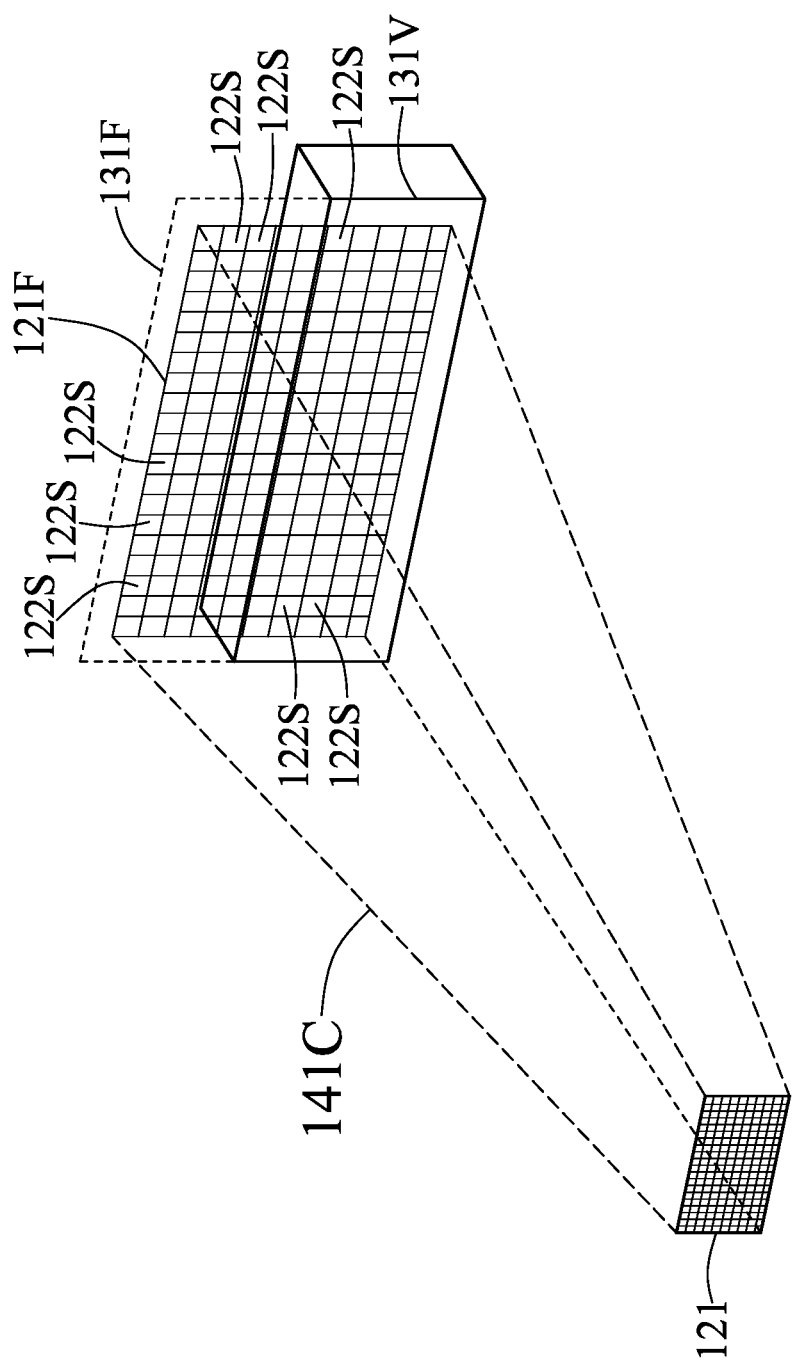
FIG. 9 illustrates a schematic diagram of the final mesh model 121F attached to the virtual coverage area 131V and to an extension plane 131F of the virtual coverage area 131V.

Please refer to FIG. 9. FIG. 9 illustrates a schematic diagram of the final mesh model 121F attached to the virtual coverage area 131V and to an extension plane 131F of the virtual coverage area 131V. When part of the mesh points 122 of the mesh model 121 and the virtual coverage area 131V cannot perform the mapping calculation, some of the mesh points 122 are projected on an extension plane 131F at one edge of the virtual coverage area 131V. In other words, a part of the final mesh model 121F is attached to the virtual coverage area 131V, and the remaining final mesh model 121F is attached to the extension plane 131F. In this way, a complete image can be presented.

Figure 10:
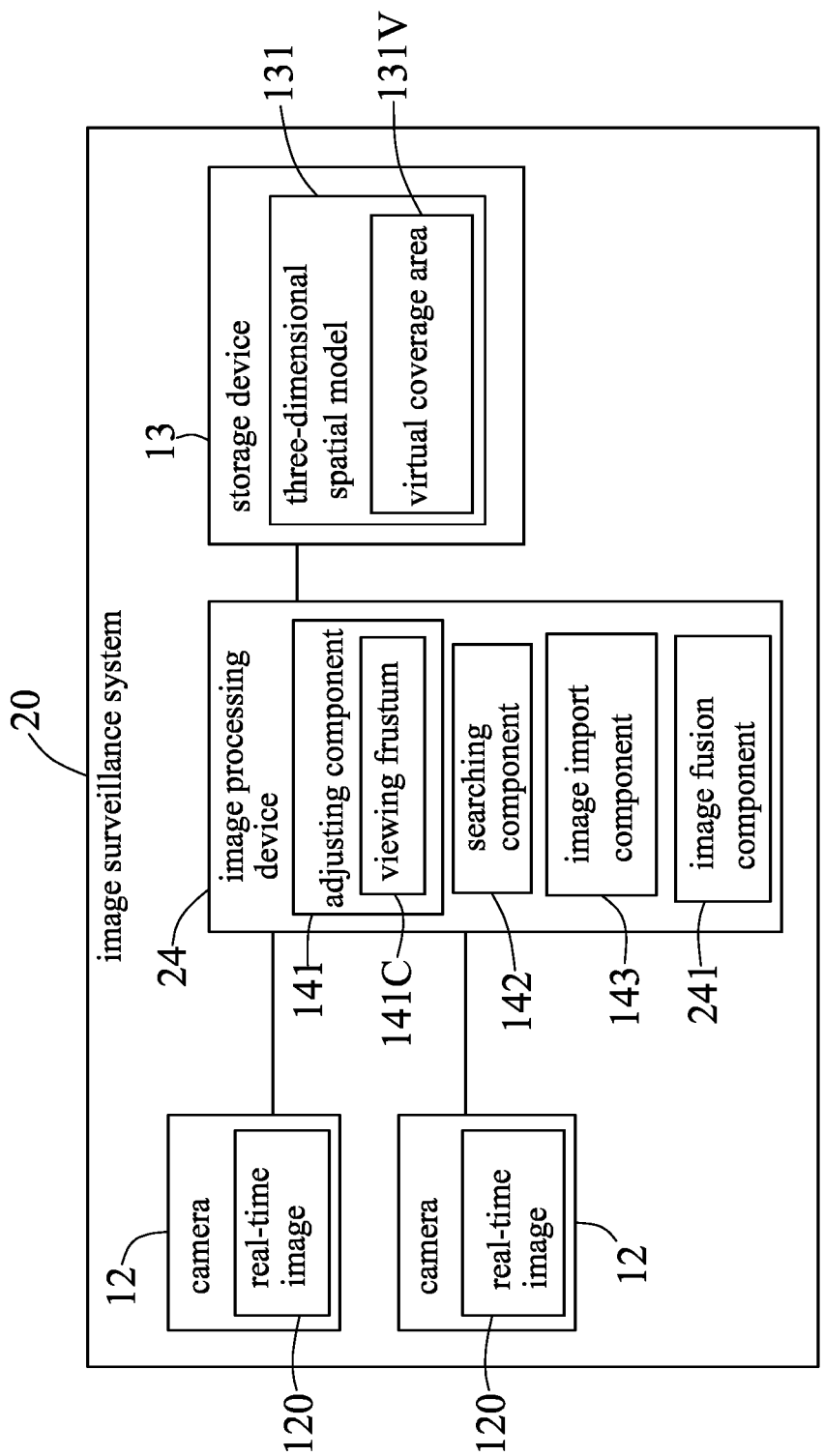
FIG. 10 illustrates a block diagram of an image surveillance system 20 of another embodiment of the present invention.

Please refer to FIG. 10. FIG. 10 illustrates a block diagram of an image surveillance system 20 of another embodiment of the present invention. The differences between the image surveillance system 20 and the image surveillance system 10 will be mentioned as following. An image processing device 24 of the image surveillance system 20 further comprises an image fusion component 241. When the real-time images 120 shot by a plurality of cameras 12 overlap partially, an image fusion algorithm is used by the image fusion component 241. The overlapping real-time images are converted to a composite image (not drawn). In this way, it is helpful for the surveillance personnel to determine whether the objects or human bodies appearing in different cameras 12 belong to the same object or the same human body. Furthermore, the composite image can be imported to the three-dimensional space model 131 by the image import component 143. The composite image is projected to the virtual coverage area 131V. In addition, the image fusion algorithm comprises a scale-invariant feature transform algorithm.

Figure 11A:
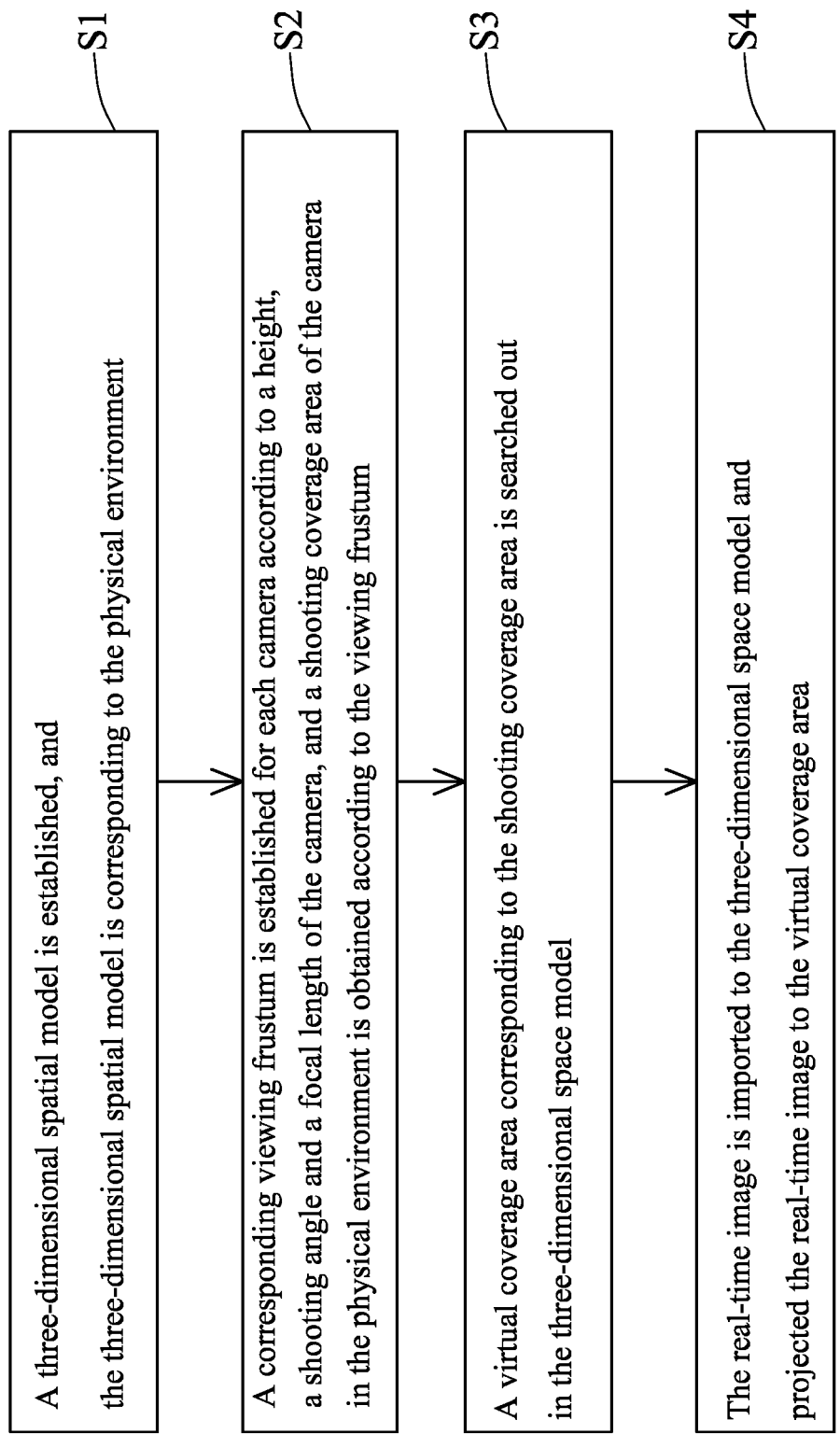
FIG. 11A illustrates a flow chart of an image display method of the present invention.

Please refer to FIG. 11A. FIG. 11A illustrates a flow chart of an image display method of the present invention. The image display method in the present invention is used to the image surveillance system 10. The image display method has the following steps:

First, please refer to the step S1, FIG. 2A and FIG. 5A. A three-dimensional spatial model 131 is established, and the three-dimensional spatial model 131 is corresponding to the physical environment 8. Next, please refer to the step S2 and FIG. 4A. A corresponding viewing frustum 141C is established for each camera according to a height, a shooting angle, and a focal length of the camera 12. A shooting coverage area 81 of the camera in the physical environment is obtained according to the viewing frustum 141C. Next, please refer to the step S3 and FIG. 5B. A virtual coverage area 131V corresponding to the shooting coverage area is searched out in the three-dimensional space model 131. Next, please refer to the step S4 and FIG. 6. The real-time image 120 shot by the camera 12 is imported to the three-dimensional space model 131, and the real-time image 120 is projected the real-time image to the virtual coverage area 131V. By using the image display method from the step Si to the step S4, the surveillance personnel can view the real-time surveillance image in each area of the three-dimensional space model 131.

Figure 11B:
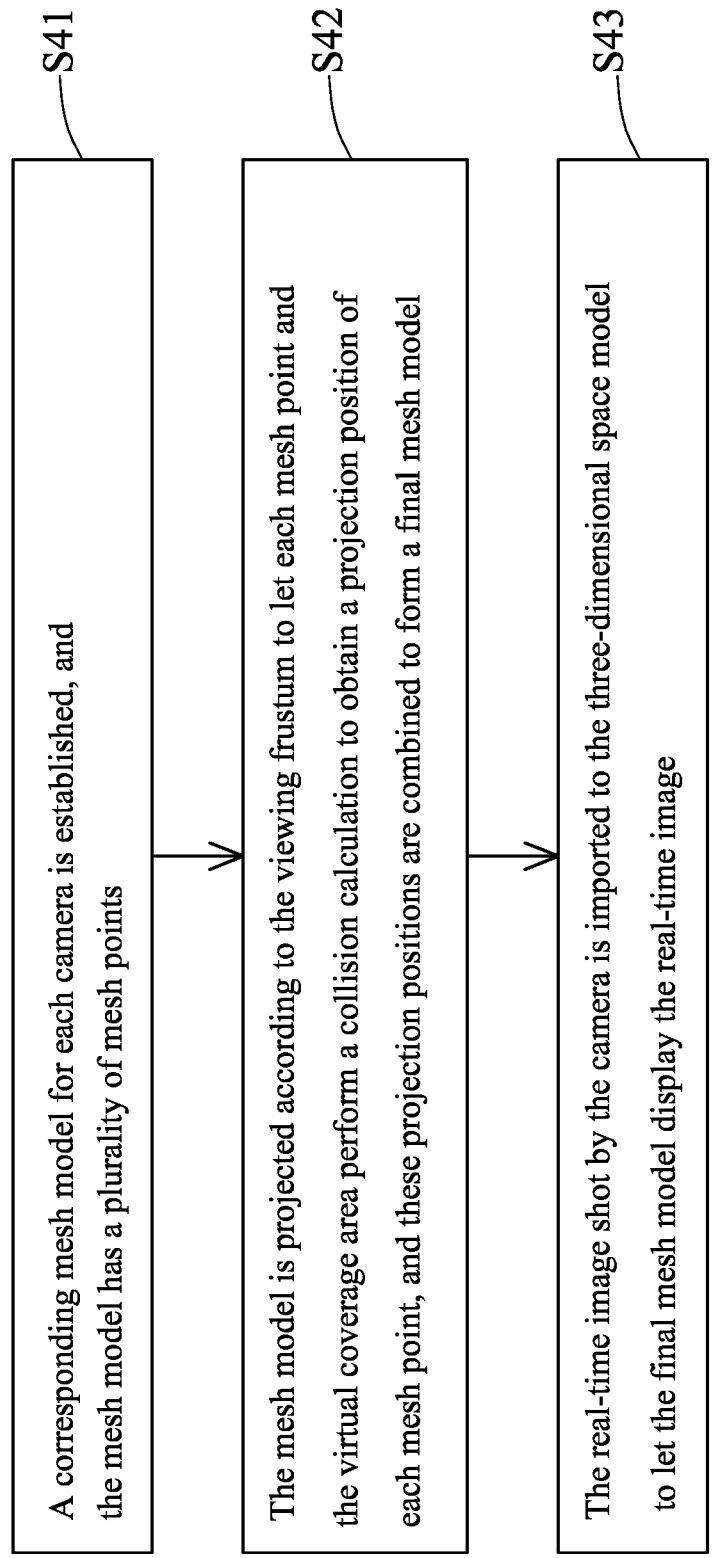
FIG. 11B illustrates a flow chart of a sub-step of the step S4 in FIG. 11A.

Please refer to FIG. 11B. FIG. 11B illustrates a flow chart of a sub-step of the step S4 in FIG. 11A. The sub-step has the following steps:

First, please refer to the step S41. A corresponding mesh model 121 for each camera is established, and the mesh model 121 has a plurality of mesh points 122. Next, please refer to the step S42. The mesh model 121 is projected according to the viewing frustum 141C to let each mesh point 122 and the virtual coverage area 131V perform a mapping calculation to obtain a projection position 122S of each mesh point 122, and these projection positions 122S are combined to form a final mesh model 121F. Next, please refer to the step S43. The real-time image 120 shot by the camera 12 is imported to the three-dimensional space model 131 to let the final mesh model 121F display the real-time image 120. After the processing from the step S41 to the step S43, the real-time image 120 can be projected on the virtual coverage area 131V.

In summary, the image display method and the image surveillance system of the present invention can display real-time surveillance images of different areas and identify whether objects or human bodies appearing on different cameras 12 are the same.

Although the description above contains many specifics, these are merely provided to illustrate the invention and should not be construed as limitations of the invention's scope. Thus, it will be apparent to those skilled, in the art that various modifications and variations can be made in the system and processes of the present disclosure without departing from the spirit or scope of the invention.

What is claimed is:

1. An image display method used to an image surveillance system, the image surveillance system comprising a plurality of cameras, the camera shooting a part of a physical environment to form a real-time image, the image display method comprising:
    (a) establishing a three-dimensional spatial model, the three-dimensional spatial model corresponding to the physical environment;
    (b) establishing a corresponding viewing frustum for each camera according to a height, a shooting angle, and a focal length of the camera, obtaining a shooting coverage area of the camera in the physical environment according to the viewing frustum;
    (c) searching out a virtual coverage area in the three-dimensional space model and the virtual coverage area is corresponding to the shooting coverage area; and
    (d) importing the real-time image to the three-dimensional space model and projecting the real-time image to the virtual coverage area.

2. The image display method of claim 1, wherein the step (d) comprises the following steps:
    (d1) establishing a corresponding mesh model for each camera, the mesh model comprising a plurality of mesh points;
    (d2) projecting the mesh model according to the viewing frustum to let each mesh point and the virtual coverage area perform a mapping calculation to obtain a projection position of each mesh point, combining these projection positions to form a final mesh model;
    (d3) importing the real-time image shot by the camera to the three-dimensional space model to let the final mesh model display the real-time image.

3. The image display method of claim 1, wherein when the real-time images shot by a plurality of cameras overlap partially, using an image fusion algorithm, and converting overlapping real-time images to a composite image according to the image fusion algorithm, the composite image projected to the virtual coverage area.

4. The image display method of claim 3, wherein the image fusion algorithm comprises a scale-invariant feature transform algorithm.

5. The image display method of claim 3, wherein when some of the mesh points of the mesh model cannot perform the mapping calculation with the virtual coverage area, some of the mesh points are projected to an extension plane of an edge of the virtual coverage area.

6. An image surveillance system comprising:
    a plurality of cameras, the camera shooting a part of a physical environment to form a real-time image;
    a storage device, storing a three-dimensional spatial model, the three-dimensional spatial model corresponding to the physical environment;
    an image processing device, connected to the camera, the image processing device comprising:
        an adjusting component, establishing a corresponding viewing frustum for each camera according to a height, a shooting angle, and a focal length of the camera, obtaining a shooting coverage area of the camera in the physical environment according to the viewing frustum;
        a searching component, searching out a virtual coverage area in the three-dimensional space model, and the virtual coverage area is corresponding to the shooting coverage area; and
        an image import component, importing the real-time image to the three-dimensional space model and projecting the real-time image to the virtual coverage area.

7. The image surveillance system of claim 6, wherein the image import component performs the following steps:
    (d1) establishing a corresponding mesh model for each camera, the mesh model comprising a plurality of mesh points.
    (d2) projecting the mesh model according to the viewing frustum to let each mesh point and the virtual coverage area perform a mapping calculation to obtain a projection position of each mesh point, combining these projection positions to form a final mesh model; and
    (d3) importing the real-time image shot by the camera to the three-dimensional space model to let the final mesh model display the real-time image.

8. The image surveillance system of claim 7, wherein the image processing device further comprises an image fusion component; wherein the real-time images shot by a plurality of cameras overlap partially, the image fusion component converting overlapping real-time images to a composite image according to an image fusion algorithm.

9. The image surveillance system of claim 7, wherein when some of the mesh points of the mesh model cannot perform the mapping calculation with the virtual coverage area, some of the mesh points are projected to an extension plane of an edge of the virtual coverage area.

10. The image surveillance system of claim 8, wherein the image fusion algorithm comprises a scale-invariant feature transform algorithm.

* * * * *